C. E. HAYNES.
Hitching Device for Animals.
No. 217,103.                    Patented July 1, 1879.
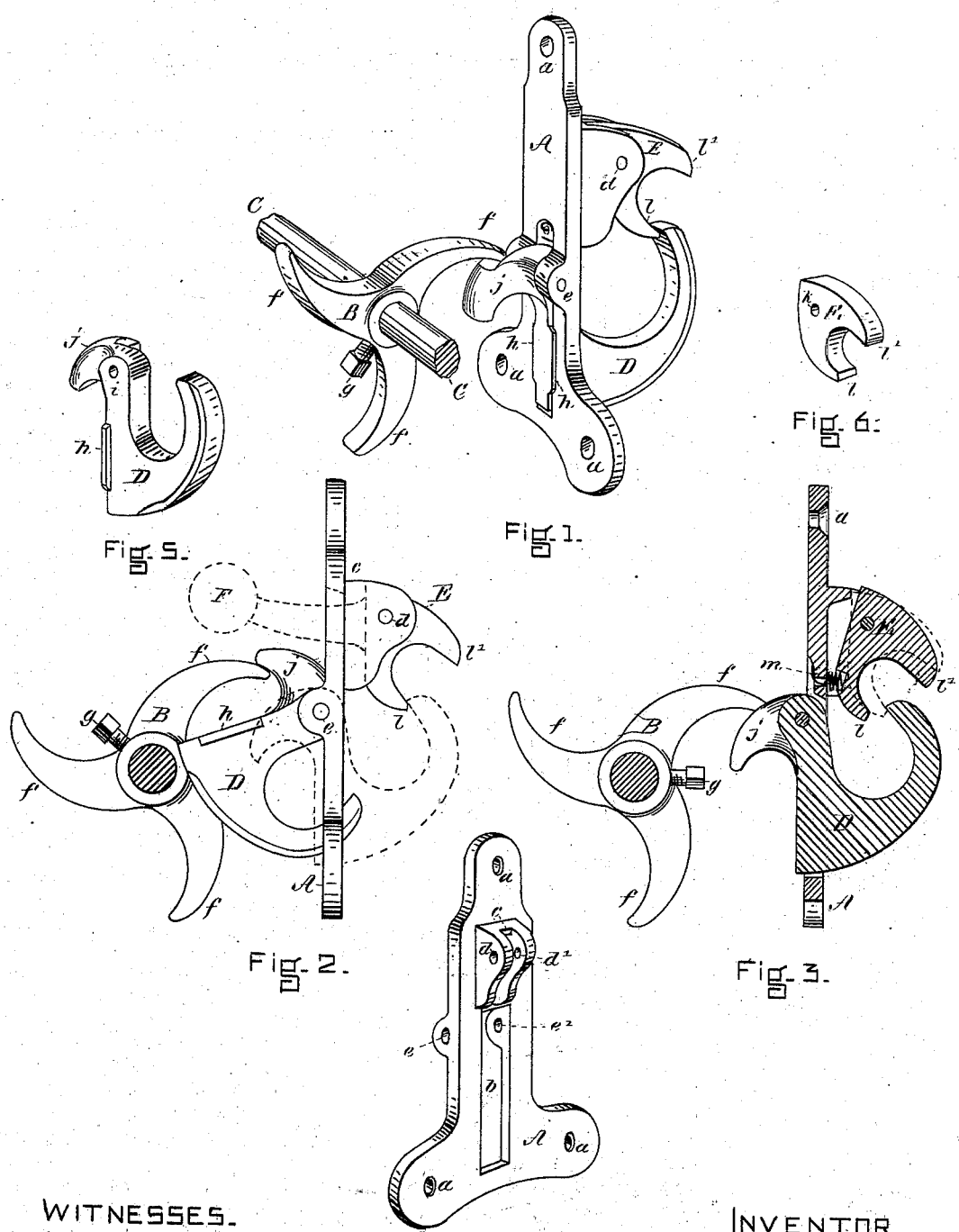

UNITED STATES PATENT OFFICE.

CORNELIUS E. HAYNES, OF BOSTON, MASSACHUSETTS.

IMPROVEMENT IN HITCHING DEVICES FOR ANIMALS.

Specification forming part of Letters Patent No. 217,103, dated July 1, 1879; application filed April 19, 1879.

*To all whom it may concern:*

Be it known that I, CORNELIUS E. HAYNES, of Boston, Massachusetts, have invented an attachment for hitching and releasing animals to and from their stall-fastenings, called a "Hitching Device," of which the following is a specification.

The object of my invention is to provide a means for instantaneously releasing from their stable-fastenings one or any number of animals. I do this by hinging the holding-hook upon a hinge, and so adjusting it and its associate devices that it is locked in position to retain the halter-loop when the animal is to be held fast, and can be withdrawn from the loop when the animal is to be released.

The devices for keeping this hook in holding position and withdrawing it therefrom constitute the chief part of my invention. They are so constructed and arranged that the operator may, by one action outside of the stable, make fast or withdraw the hooks in any number of stalls in one line. They consist of a three-pronged cam for each stall, to which the device is applied, fixed upon a rod extending along the front of the stalls, and a holding-hook for each stall, made to swing backward and forward. The prongs of the cam bear upon a shoulder on the hook, and hold it forward in fastening position or under said shoulder, and withdraw it from said position, as said rod is turned one way or the other.

When the hook is in holding position I close the opening at the top by hanging a curved lever in such position that the weight of the rear end bears the front end against the under side of said hook. Depressing the front end of the lever permits the halter-loop to be passed over the end without withdrawing the hook from its position.

Referring to the drawings, Figure 1 represents the turning rod, having fixed upon it the locking-cam. This rod extends along the stalls to which the holding-hooks are fixed and on the opposite side of the partition. Fig. 2 represents a side view of my device with the holding-hook open. Fig. 3 represents a sectional view cut through the center of my device, and showing the portion on the right side of the center line. This shows the hook locked in position by the cam, but opened by the depression of the curved lever. Fig. 4 represents the frame or bracket in which the holding-hook and lever are hung. This is to be made fast upon the front partition of the stall. It has in it a perpendicular slot, through which the hook and lever play. In the partition there is a corresponding slot, through which the hook is passed when withdrawn. Fig. 5 represents the swinging hook. Fig. 6 represents the curved lever hung upon an axis on the bracket, and used to close the opening of the holding-hook.

A is the frame or bracket in which the holding-hook and lever are hung. *a a a* are screw-holes, by which it is made fast to the stall. *b* is the slot through which the holding-hook swings, and through which the lever passes. *c* is the projection upon which stand the ears in which the axis of the lever is journaled. *d d* are the ears. B is the locking and releasing cam. It has three prongs, curved and set equidistant upon its body, which act upon the holding-hook. *f f f* are said prongs. *e* is the hole through which the rod passes, and *g* is the set-screw by which the cam is made fast upon the rod. C is the turning rod. This is made fast to the stall by staples or other means which permit it to turn.

D is the holding-hook. *h h* are flanges or lips, which prevent it from being drawn too far through the slot *b*. *j* is a shoulder upon the rear side, against the upper side of which one of the prongs *f* bears to keep the hook in holding position, and against the under side of which another of said prongs *f* is made to bear when the rod is turned to withdraw the hook for releasing. This hook is hung upon an axis journaled in two ears projecting from the rear side of the bracket A, and swings through the slot and a corresponding slot in the partition back or forward, according as the cam B is turned one way or the other, and one of the prongs *f* bears upon the upper or lower side of the shoulder *j*.

E is the curved lever employed to close and open the passage over the end of the holding-hook. It is hung upon an axis on the front side of the bracket A. Its rear end is weighted, so as to bear the front end against the inside of the upper end of the holding-hook D. The front end is crutch-shaped, and its two horns $l\ l$ embrace the upper end of the holding-hook. The lower of these horns is borne by the weight of the other end of the lever against the holding-hook and closes the passage, while the upper horn is used as a thumb-piece to depress this end of the lever and open the passage to the hook when it is desired to do so without unlocking or moving the cam B.

A spring, $m$, may be used to bear the lever against the holding-hook instead of a weight.

I do not consider this mode of opening and closing the passage to the holding-hook by the use of the lever E to be new.

The mode of applying and operating my device is simple. The bracket A is made fast upon the front of the stall. A slot corresponding to the slot $b$ is cut through the partition, in which the hook D and lever E play. The rod C is made fast on the opposite side of the partition in such position that the prongs $f f f$ of the cam B will bear upon the upper and under sides of the shoulder $j$ of the holding-hook when the rod is turned. The rod extends along all the stalls to which the hooks are applied, and has upon it a device for turning it at one or more convenient points. In ordinary use the holding-hook remains locked in position for holding, and the animal is made fast or released by opening the passage to the hook by depressing the front end of the lever E; but when it is desired quickly to release all the animals the rod C is turned and one prong $f$ is raised from the upper side, and the next prong $f$ is brought against the under side of the shoulder $j$, and the hook D is thereby drawn backward and the halter-loops released at once.

I claim—

The combination of the turning rod C with the cam B, the hook D, the lever E, and the bracket A, constructed as and for the purposes described.

CORNELIUS E. HAYNES.

In presence of—
WM. ASPINWALL,
EDWARD H. WILLIAMS.